Aug. 23, 1938.  H. J. HORN  2,127,599
VEHICLE WHEEL
Filed Nov. 7, 1936
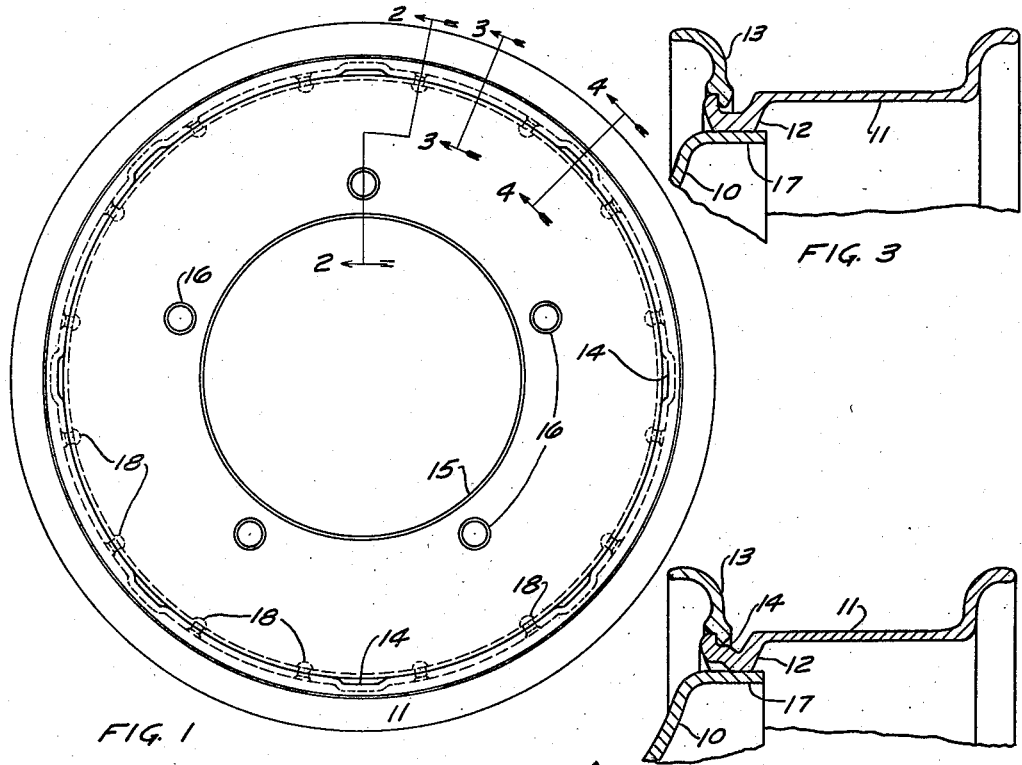
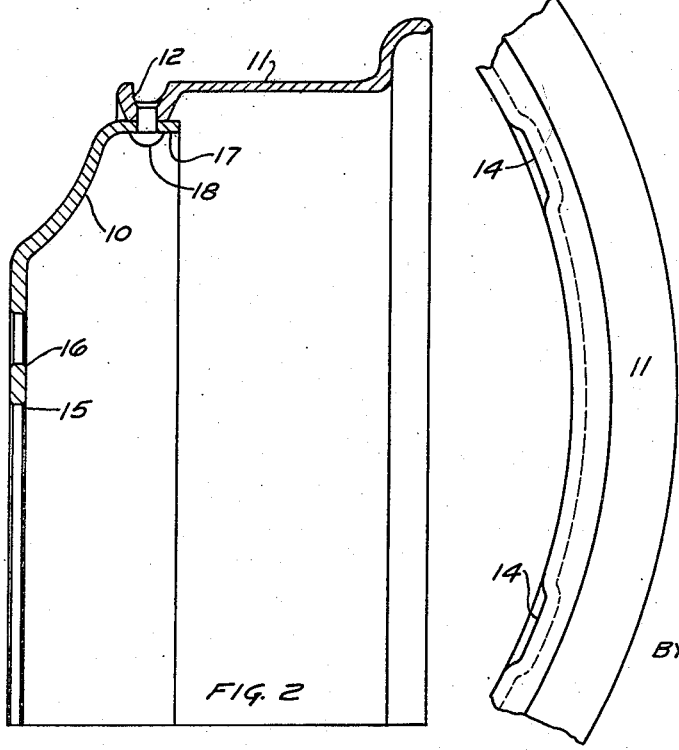
INVENTOR.
HARRY J. HORN
BY
Carroll R. Taber
ATTORNEY.

Patented Aug. 23, 1938

2,127,599

UNITED STATES PATENT OFFICE 2,127,599

VEHICLE WHEEL

Harry J. Horn, Lansing, Mich., assignor to Motor Wheel Corporation, Lansing, Mich., a corporation of Michigan Application November 7, 1936, Serial No. 109,626

3 Claims. (Cl. 301—63)

This invention relates to vehicle wheels and more particularly to that type of wheel including a rim having a side ring receiving gutter formed at one edge thereof. The rim is preferably of the type including a shoulder formation within the gutter upon which the edge of the side ring rests to properly position the side ring upon the rim when the tire carried by the rim is inflated.

According to the present invention a rim of the character described is secured to the peripheral seat of a wheel body by pressing the radially inner surface of the gutter into engagement with the radially outer surface of the peripheral seat and securing the parts in this relation by rivets extending through the base of the gutter and the peripheral seat. Where it is desired to employ a shoulder in the gutter as mentioned above the shoulder is formed in circumferentially spaced segments with the rivets positioned between the shoulder segments.

A preferred embodiment of the invention is shown in the accompanying drawing wherein—

Figure 1 is a side view of a wheel incorporating the present invention;

Figure 2 is an enlarged fragmentary sectional view of the wheel shown in Figure 1 taken on substantially the line 2—2 of Figure 1;

Figure 3 is an enlarged fragmentary sectional view taken on the line 3—3 of Figure 1 showing a side ring installed in the rim gutter;

Figure 4 is a sectional view similar to Figure 3 but taken on substantially the line 4—4 of Figure 1 through one of the shoulder segments in the gutter; and Figure 5 is a fragmentary side view of the rim showing the construction and arrangement of the shoulder segments located in the gutter.

The wheel shown in the accompanying drawing comprises a wheel body 10 having a rim 11 secured to the periphery thereof. The rim 11 is provided at one edge thereof with a radially inwardly extending gutter 12 adapted to receive a side ring 13.

The side ring 13 is an endless ring which is adapted to be mounted in the gutter 12 of rim 11 by inserting one edge deeply into the gutter to permit the diametrically opposite edge of the ring to be sprung over the corresponding radially outer edge of the gutter. In order to insure the proper positioning of the side ring 13 in the gutter, the gutter is provided at circumferentially spaced intervals with radially outwardly extending indentations 14 upon which the radially inner edge of the side ring 13 rests when the side ring is in proper position, all as shown in Figure 4 of the drawing.

The wheel body 10 may be of any conventional form and is here shown as including a large central hub receiving opening 15 surrounded by small securing bolt receiving openings 16 by means of which the wheel body is attached to a hub in a conventional manner. At its periphery the wheel body 10 is provided with a continuous annular rim seat 17.

The rim 11 is mounted upon the rim seat 17 by pressing the radially inner surface of the gutter 12 into engagement with the radially outer surface of the rim seat. The rim is secured in this position by means of rivets 18 extending through the base of the gutter 12 and the rim seat 17. The rivets 18, as best shown in Figure 1, are located intermediate the circumferentially spaced indentations 14 formed in the base of gutter 12, two rivets preferably being used between adjacent indentations. The gutter 12 is of sufficient width to accommodate the riveting operation.

Various advantages accrue from constructing a wheel in accordance with the present invention.

First of all, there is a substantial saving in material by attaching the rim gutter directly to the periphery of the wheel body, as in that case the diameter of the wheel body need not be as great as where the wheel body is attached to another portion of the rim. This form of connection also permits of a variable offset between the wheel body and the center line of the rim by reversing the position of the wheel body to cause the rim seat to extend either axially inwardly, as shown in Figure 2, or axially outwardly.

Since the thickness of a conventional form of gutter of the type under consideration is substantially greater than the thickness of the remainder of the rim, the gutter provides a strong annular ring into which the wheel body may be pressed to produce a tight fit. Because of the added thickness of the gutter base there is also provided a better riveting connection between the rim and the wheel body when the gutter is riveted directly to the wheel body.

By locating the rivet connection between the rim and the wheel body in the gutter, the head of the rivet is located in a region removed from that occupied by the tire, and need not be countersunk as is required where the rivet head is placed in the base of the rim proper.

While only a preferred embodiment of the present invention has been herein shown and described, it will be understood that the invention is not limited to this preferred embodiment, but rather is co-extensive with the scope of the appended claims.

I claim:

1. A wheel comprising a wheel body having a peripheral rim seat, a rim mounted upon the rim seat, said rim having a gutter at one edge thereof, the base of the gutter being indented radially outwardly at circumferentially spaced intervals to form supports for the edge of a side ring, a continuous side ring mounted upon the rim with an edge located within the gutter upon said indentations, and means associated with the base of the gutter and the peripheral portion of the wheel body for fastening the rim to the wheel body.

2. A wheel comprising a wheel body having a peripheral rim seat, a rim having a side ring receiving gutter at one edge thereof mounted upon the wheel body with the radially inner surface of the gutter contacting the peripheral rim seat, the gutter being provided with a shoulder to form a support for the edge of a side ring, and a continuous side ring mounted upon the rim with an edge located within the gutter upon said shoulder, the rim being secured to the wheel body by securing means extending through the base of the gutter and the peripheral rim seat.

3. A wheel comprising a wheel body having a peripheral rim seat, a rim having a side ring receiving gutter at one edge thereof, the base of the rim gutter provided with a plurality of raised portions for positioning the side ring in the gutter, the rim being mounted upon the wheel body with portions of the radially inner surface of the gutter base intermediate the said raised portions contacting and secured to the rim seat by means of rivets extending through the base of the gutter and the rim seat.

HARRY J. HORN.